(12) United States Patent
Langereis

(10) Patent No.: US 7,123,562 B2
(45) Date of Patent: Oct. 17, 2006

(54) METHOD AND DEVICE FOR DETERMINING A SET OF RECORDING PULSE SERIES PARAMETERS FOR OPTICAL CARRIER RECORDING AND OPTICAL RECORD CARRIER

(75) Inventor: Gerardus Rudolph Langereis, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 36 days.

(21) Appl. No.: 10/517,974

(22) PCT Filed: Jun. 20, 2003

(86) PCT No.: PCT/IB03/02394

§ 371 (c)(1),
(2), (4) Date: Dec. 15, 2004

(87) PCT Pub. No.: WO04/001730

PCT Pub. Date: Dec. 31, 2003

(65) Prior Publication Data

US 2005/0232106 A1    Oct. 20, 2005

(30) Foreign Application Priority Data

Jun. 20, 2002 (EP) .................... 02077527

(51) Int. Cl.
*G11B 7/00* (2006.01)
(52) U.S. Cl. ............... 369/47.51; 369/53.34; 369/59.11
(58) Field of Classification Search ............. 369/47.53, 369/59.12, 53.34, 59.11

See application file for complete search history.

(56) References Cited

U.S. PATENT DOCUMENTS

| | | | | |
|---|---|---|---|---|
| 5,226,027 A * | 7/1993 | Bakx | ........................ | 369/47.55 |
| 5,249,172 A * | 9/1993 | Hagihara et al. | ........ | 369/47.53 |
| 5,809,007 A * | 9/1998 | Takemura et al. | ....... | 369/275.3 |
| 6,459,666 B1 * | 10/2002 | Yokoi | ...................... | 369/47.15 |
| 6,611,481 B1 * | 8/2003 | Koishi et al. | ............. | 369/47.53 |
| 6,791,926 B1 * | 9/2004 | Furumiya et al. | ........ | 369/53.13 |
| 6,807,134 B1 * | 10/2004 | Nakajima et al. | ........ | 369/47.35 |

FOREIGN PATENT DOCUMENTS

| | | |
|---|---|---|
| EP | 0104566 B1 | 9/1983 |
| EP | 0865035 A2 | 9/1998 |
| EP | 0865035 A3 | 3/1999 |
| WO | WO9930316 A2 | 6/1999 |
| WO | WO9930316 A3 | 6/1999 |

* cited by examiner

*Primary Examiner*—Wayne Young
*Assistant Examiner*—Minerva Rivero

(57) ABSTRACT

A method is described for determining a set of recording pulse series parameters for recording information on an optical record carrier. First a series of test patterns is written on the record carrier with a values of the parameters. On reading the test patterns, the jitter values of each read signal is determined. The optimum values of the parameters are derived from a linear dependence between the set of recording pulse series parameters and the relative jitter values. The invention relates also to a device arranged to perform the method. The invention further relates to an optical record carrier comprising the optimum recording power as determined by the method according to the invention.

10 Claims, 2 Drawing Sheets

METHOD AND DEVICE FOR DETERMINING A SET OF RECORDING PULSE SERIES PARAMETERS FOR OPTICAL CARRIER RECORDING AND OPTICAL RECORD CARRIER The invention relates to a method of determining values of a set of recording pulse series parameters for optical carrier recording, where the recording pulse series are applied to a recording surface of an optical record carrier for writing a pattern of optically readable marks on the record carrier, a mark being formed by one recording pulse series, said method comprising writing a write test, each write test comprising a number N of test patterns, and each test pattern with pre-determined values of the set of the recording pulse series parameters, said values being different for each test pattern; and reading the test pattern and forming a read signal; and measuring jitter values of the read signal corresponding to each test pattern.

The invention also relates to a device for determining values of a set of recording pulse series parameters for optical carrier recording, comprising recording means for writing a pattern of optically readable marks on a record carrier by irradiating a recording surface of the record carrier with recording pulse series, a mark being formed by one recording pulse series; a test signal generator for generating a test signal comprising a test pattern and supplying the test signal to an input of the recording means; reading means for reading marks on the record carrier and supplying the read signal; a jitter detector for measuring jitter values of the read signal corresponding to the test pattern and supplying the jitter signal to control means; control means for optimizing the values of the set of the recording pulse series parameters and supplying a control signal representing the optimized set of the recording pulse series parameters; processing means for converting input information to be recorded into an output signal supplied to the recording means, the output signal corresponding to pulse series of radiation and representing the input information, where optimized values of the set of the recording pulse series parameters are provided by the control signal.

The invention further relates to an optical record carrier inscribable by a radiation beam, comprising a substrate and means on the substrate comprising control information.

Japanese patent application No 11005244 discloses such a method for writing optical record carriers with optimized recording pulse parameters. According to the known method, a write test with standard values of write pulse parameters is performed. Subsequently, write tests are evaluated by evaluation parameters (e.g. jitter) and properties of an approximation formula for evaluation parameters are determined. Finally, the optimized values of recording pulse parameters are calculated using the approximation formula. The known method, however, requires complicated calculations for each specific set of standard values of write tests and employs the approximation formula which is not scalable and universal.

It is an object of the invention to provide a universal method and device for determining values of recording pulse parameters for optical carrier recording. It is also an object of the invention to provide a device being operative to perform such a method. It is further object of the invention to provide the optical record carrier, on which the information regarding the method is stored.

The first object is achieved when the method as described in the preamble is characterized in that the values of the set of the recording pulse series parameters are optimized using a linear dependence between the values of a set of recording pulse series parameters and relative jitter values. Another feature of the invention is that the minimum number $N_{min}$ of the test patterns is dependent upon a number P of the recording pulse series parameters by the equation $N_{min}=2*P+1$. The pattern of optically readable marks may correspond, for example, to a run-length limited code sequence. Furthermore, the set of the optimized values of the recording pulse series parameters may be recorded on the optical record carrier. The invention in its embodiment is characterized in that the test patterns comprise a random run-length limited code sequence. In another embodiment the parameter denotes a radiation power of one of the recording pulses of the recording pulse series or a width of one of the recording pulses of the recording pulse series. In the preferred embodiment the parameters for 3T marks differ from the parameters for longer marks and where T represents the time length of one period of a reference clock in a data signal.

The second object of the invention is achieved when the device as described in the preamble is characterized in that the control means is arranged to derive the optimized values of the set of the recording pulse series parameters using a linear dependence between the values of a set of recording pulse series parameters and relative jitter values. Furthermore, the device may comprise storage means for storing coefficients of the linear dependence between the values of a set of recording pulse series parameters and the relative jitter values. Storage means may also be operative to store the set of the optimized values of the set of the recording pulse series parameters.

The third object of the invention is achieved when the optical record carrier as described in the preamble is characterized in that the control information includes pre-determined values of coefficients of a linear dependence between values of a set of recording pulse series parameters and relative jitter values. Furthermore, the control information may include optimized values of a set of recording pulse series parameters.

The objects, features and advantages of the invention will be apparent from the following, more specific description of embodiments of the invention as illustrated in accompanying drawings; therein:

Figure 4:
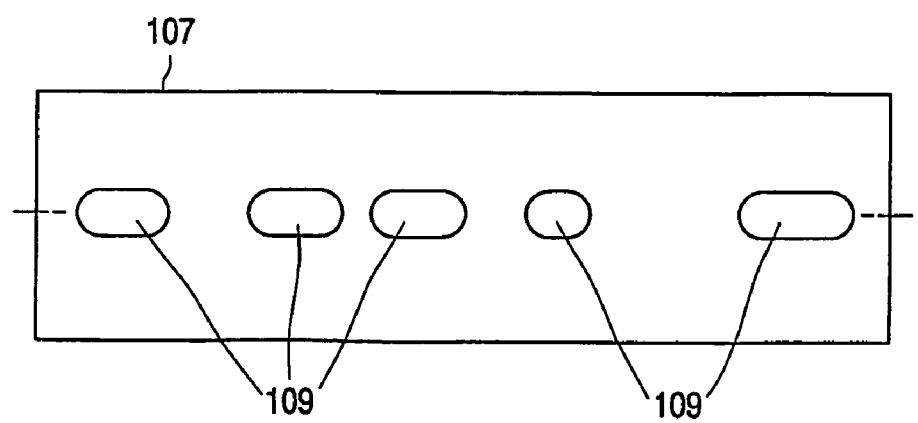

FIG. 4 shown a strongly enlarged portion of the track comprising a pattern of marks in which the control information is encoded.

Figure 1:
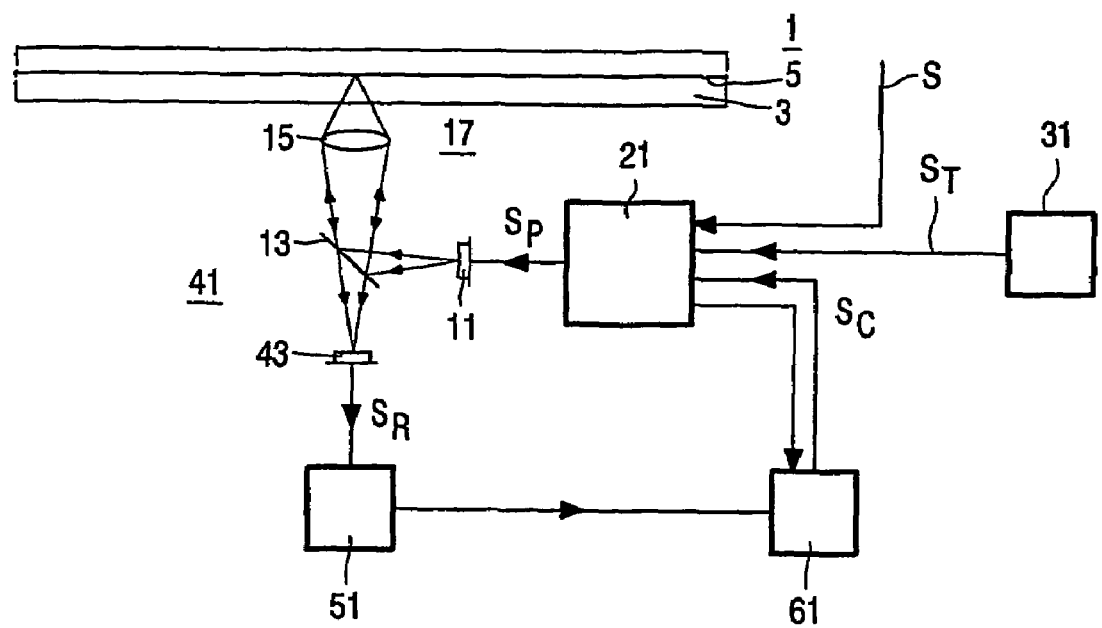
FIG. 1 shows a diagram of an optical recording device according to the invention.

FIG. 1 shows a device and an optical recording record carrier 1 according to the invention. The disk-shaped record carrier 1 has a transparent substrate 3 and a recording layer 5 arranged on it. The recording layer 5 comprises a material suitable for writing information by means of a radiation beam. The recording material may be phase-change, dye or any other material suitable for optical recording. Information may be recorded on the record carrier 1 in the form of optically detectable marks and lands on the record carrier.

The device comprises a radiation source, e.g. a semiconductor laser 11, for emitting a radiation beam. A mark is formed when the recording layer 5 of the recording record carrier 1 is exposed to a single recording pulse of the radiation, characterized by a recording pulse parameter, which in this embodiment is a recording power level. A mark may also be written by a series of radiation pulses of equal or different lengths and one or more recording power levels. The radiation beam is converged on the recording layer 5 via a beam splitter 13, an objective lens 15 and the substrate 3. The record carrier 1 may also be air-incident, where the radiation beam is directly converged on the recording layer 5 without passing through the substrate 3. The semiconductor laser 11, the beam splitter 13 and the objective lens 15 form together a recording unit 17.

The device comprises also a processing unit 21, which consists of, for example, a processor of the processing unit 23, where the processor is understood to mean any means suitable for performing calculations, e.g. a microprocessor or a digital signal processor. A signal S (e.g. an information signal or a test signal), representing the information to be written on the record carrier 1, is fed into the processor of the processing unit 21. The processing unit 21 determines the set of the recording pulse series parameters for recording the information on the record carrier 1. In the specific embodiment the set of the recording pulse series parameters consists of recording power levels of the recording pulse. Determination of the recording power levels is performed taking into account an optimum recording power levels $P_{opt}$ calculated by a control unit 61. The control signal $S_C$ of the control unit 61 is supplied to the processing unit 21. Once the optimum recording power levels $P_{opt}$ for a specific record carrier 1 is calculated, it may be supplied to the processing unit 21 from the information recorded on the record carrier 1. An output of the processing unit 21 is connected with the semiconductor laser 11 and the control unit 61.

The device further comprises a test signal generator 31. The test signal generator 31 may consist of a processor of the test signal generator, which is suitable of generating the test signal $S_T$. The test signal $S_T$ should preferably represent a test pattern which, when coded in the so-called eighth-to-fourteen modulation (EFM), comprises marks of all length. The test signal $S_T$ may be a random signal. The test signal $S_T$ is supplied to the input of the processing unit 21.

The device further comprises a reading unit 41 formed by the semiconductor laser 11, the beam splitter 13, the objective lens 15, a detection system 43 and a circuit (not shown on the diagram) of the reading unit. The recorded record carrier 1 is exposed to the radiation beam at the reading power level $P_{read}$ emitted from the semiconductor laser 11. Radiation reflected from the record carrier 1 is converged by the objective lens 15 and, after passing through the beam splitter 13, falls on the detection system 43, which converts the incident radiation into electric detector signals. The detector signals are input to a circuit of the reading unit, which derives several signals from the detector signals, such as a read signal $S_R$ representing the information being read from the record carrier 1. The read signal $S_R$ is further fed into a jitter detector 51. The jitter detector 51 measures jitter values of the read signal $S_R$. Jitter is defined as the variance of a certain timing error. This can be either data to clock or data to data timing errors. From that point of view it is understood easily that data to data jitter is $\sqrt{2}$-times larger than data to clock jitter since data to data jitter is the result of two not correlated jittering data to clock edges. In spite of this difference, all types of jitters can be treated similar in the coming arguments.

The jitter values are supplied into the control unit 61 comprising a processor of the control unit, which may be a simple microprocessor. The control unit 61 is also supplied with the signal $S_P$ from the processing unit 61 containing the values the recording power levels P with which the test patterns have been recorded. The role of the control unit 61 is to derive optimum values of the recording power levels $P_{opt}$ for the record carrier 1 and supply a control signal $S_C$ to the processing unit 21.

Before recording information on record carrier, the device sets its recording power levels P to the optimum values by performing the following procedure. First, a series of test patterns are recorded on the record carrier 1, each with a different pre-determined recording power level P.

The range of pre-determined powers may be selected on the basis of an indicative power level derived from control information on the record carrier 1. Subsequent patterns may be written with a step-wise increased power. The patterns may be written anywhere on the record carrier 1, also in specially provide test areas.

After reading the test patterns from the record carrier 1, the processor of the control unit 61 forms a series of value pairs for the jitter J of the read signal $S_R$ for each pattern, provided by the jitter detector 51, and the pre-determined recording power levels with which that pattern has been recorded—provided by the processing unit 21.

Figure 2:
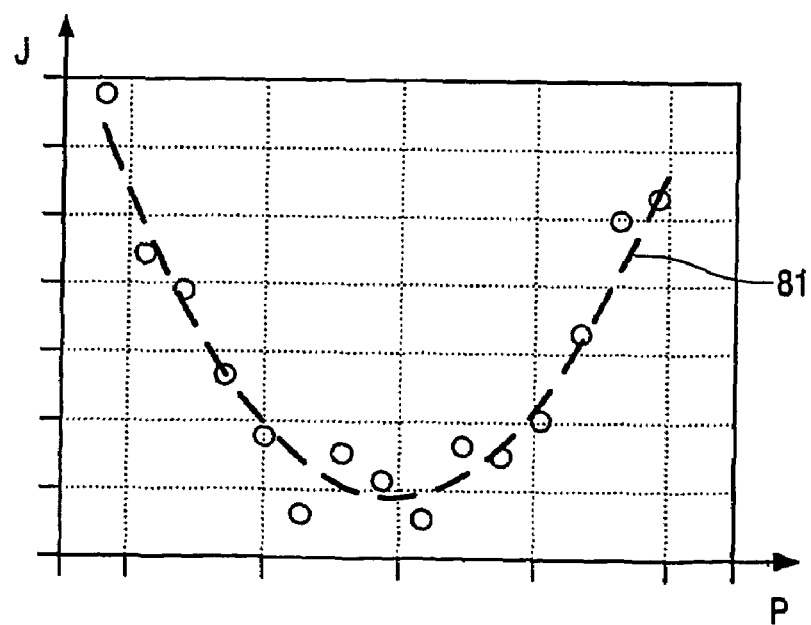
FIG. 2 shows jitter values in dependence with the recording power level (the recording pulse parameter) of the laser irradiation fitted with a non-linear curve.

FIG. 2 shows a series of N=15 points, each representing a pair of values of jitter J and predetermined recording power level of a test pattern. The points form a dependence 81 of jitter J values with respect to the pre-determined recording power level. It is apparent from FIG. 2 that the dependence exhibits a non-linear (bathtub) characteristics.

Optimization of the recording pulse parameters is based on the following. A parameter x in a certain recording pulse parameter (the parameter in a write strategy) which can be either an amplitude during a clock subdivision or a location of an edge in time. Consider the range x±δx in which this parameter results linearly into a shift in a specific edge in the hf-signal. In general, thermally balanced write strategies are defined in such a way that parameter x affects a specific edge between runlengths. For data to clock jitter measured on random EFM, jitter as a function of the parameter x, can be written as:

$$J(x)=J_{bottom}+a_x(x-\hat{x})^2 \quad (1)$$

with:

$J_{Bottom}$—bottom jitter.

$a_x$—the sensitivity of the jitter on variations.

A thermally balanced write strategy is described in the International patent application PCT/EP01/04566. Thermal crosstalk parameters further described in the embodiment will be the parameters defined in this application. The parameters for 3T marks (lands) (c, u) differ from the parameters for longer marks (d and v). The parameters c and d denote intermediate power level and the parameters u and v denote the elevated power level of the recording pulse.

A parabola is defined by three measurement points. So, if we measure the jitter for at least three settings of a certain parameter x, we are able to calculate the best setting $\hat{x}$ for a single parameter resulting into the lowest jitter.

Equation 1 is valid in a linearized region for a single write strategy parameter. Consider, in addition, the assumption that the jitter variations due to all the write strategy parameters are not correlated. The practical impact of this assumption is that the optimum setting of a parameter with respect to jitter is not dependent on the settings of the other parameters. The idea is to solve the vector $\hat{x}$ from a number of J(x) measurements. Note that if the $\hat{x}$-vector has size P (which means that the write strategy has P parameters), the smallest number of measurements equals N=2P+1. Under this assumption, we arrive at:

$$J_n = J_{bottom} + \sum_p a_p(x_{n,p} - \hat{x}_p)^2 \quad (2)$$

with
p=0 ... P−1 the number of write strategy parameters;
x a vector with the values of the P write strategy parameters;
$\hat{x}$ a vector with the optimum parameters to be determined;
a vector with the sensitivities of each parameter;
$J_{Bottom}$ lowest achievable jitter when x=$\hat{x}$ and
J(x) the measured jitter for parameters x.
n=0 ... N−1 the number of the measurement.

Equation 2 can be put into a matrix notation from which we can see that the vector of interest $\hat{x}$ is now implicitly defined. However, the bottom jitter $J_{Bottom}$ is not of interest at first instance and can be eliminated by subtracting measurements $J_0$ to $J_{N-2}$ with $J_{N-1}$.

The advantage of this operation is that equation (4.5) is now linear with the optimum parameter vector $\hat{x}$ which can be seen from the matrix notation:

$$\Delta J = \Delta X \cdot ax$$

with $$\Delta x = \begin{bmatrix} x_{0,0}^2 - x_{N-1,0}^2 & -2(x_{0,0} - x_{N-1,0}) & \cdots & x_{0,P-1}^2 - x_{N-1,P-1}^2 & -2(x_{0,P-1} - x_{N-1,P-1}) \\ \vdots & \vdots & \ddots & \vdots & \vdots \\ x_{N-2,0}^2 - x_{N-1,0}^2 & -2(x_{N-2,0} - x_{N-1,0}) & \cdots & x_{N-2,P-1}^2 - x_{N-1,P-1}^2 & -2(x_{N-2,P-1} - x_{N-1,P-1}) \end{bmatrix} \quad (3)$$

$$\Delta J = \begin{bmatrix} \Delta J_0 \\ \vdots \\ \Delta J_{N-2} \end{bmatrix} \text{ and } ax = \begin{bmatrix} a_0 \\ a_0 \hat{x}_0 \\ \vdots \\ a_{P-1} \\ a_{P-1} \hat{x}_{P-1} \end{bmatrix}$$

Each vector or matrix has its own information. The differential measurement vector $\Delta J$ has length N−1 (N the number of measurements) and is therefore known. The differential input vector $\Delta X$ is applied to the system by the operator, and therefore also known. Since, in general $\Delta X$ is not square (so has no inverse $\Delta X^{-1}$) and the linear minimum mean square parameter estimation algorithm, the vector to be determined is the sensitivity and optimum parameter vector ax which can be found using $$ax = (\Delta X^T \Delta X)^{-1} \Delta X^T \Delta J \quad (4)$$

Equation 4 can also be used for N>2P+1. From the result vector ax, the sensitivities can be found at the even entries, while the optimum parameters can then be found after normalizing the odd entries to these sensitivities. The relative values of the sensitivities will be determined by: a number of factors (e.g. the frequency of occurrence of the corresponding runlength in the EFM sequence, the width in time modulated by this parameter in the strategy, the write power change in case of an amplitude parameter is equal to the parameter value times the timeslot in which it is effective. The parameters c and d in the TBWS last for only T/4, while u and v are 9T/4 long, this will affect $a_c$, $a_d$, $a_u$ and $a_v$, etc.).

In the specific embodiment using the Thermally Balanced Write Strategy (TBWS) with thermal crosstalk compensation parameters
c for land I3,
d for land I4,
u for pit I3 and
v for pit I4, a series of parameter variation measurements are carried out. The disc is a Mitsui (internal reference number CDR01-001) phthalo disc which has its optimum write power for 16× at 25 mW (main spot on disc). The automatic iterative optimizer gives

| Merit: | RMS-norm | max-norm |
|---|---|---|
| c | 0.722 | 0.542 |
| d | 1.000 | 0.959 |
| u | 1.110 | 1.096 |
| v | 1.023 | 1.037 |
| Leading Jitter | 7.0% | 6.1% |
| Trailing Jitter | 6.4% | 6.3% | after 30 iterations with all parameters represented as multiplication factors for the write power.

First, only the land effects are optimized (number of parameters P=2). Parameter c is changed in three steps: 0.25, 0.50 and 0.75, at each c-value, d is changed in three steps: 0.5, 0.75 and 1.00. These ranges are chosen because: from the implementation of TBWS we know that the compensation for c has to be stronger than for d. Both c and d should be lower than 1. Five measurements are sufficient for this P=2 situation, but nine will give a more reliable fit. The u and v parameters are chosen 1.10 and 1.04 respectively, because these are the values that are general to almost all the discs observed in the ROS-DOS-TOS measurement sequence. Jitters are read out at 2×.

The fit algorithm is applied offline using a MathCad 6.0 worksheet. The found optimum parameters are:
c=0.496 with sensitivity 8.6 and
d=0.842 with sensitivity 5.2.

The difference between the sensitivities can be ascribed to the ratio 3T/4T because these are affected by the c and d parameters respectively. After the parameters are found, the expected (lowest achievable) value of $J_{Bottom}$ can be calculated using equation 2 and is equal to 6.8%.

When expanding the measurement data of the previous subsection (for c=0.25, 0.50, 0.75 and d=0.50, 0.75, 1.00)

with measurements for u=1.05, 1.10, 1,15 and v=1.00, 1.05 and 1.10, the four thermal crosstalk compensation parameters in the TBWS can be fitted at the same time. In the additional measurements u and v are changed, c and d are set to 0.65 and 0.85 respectively because these are the most general settings. Note that c and d do not have to be at their best value for fitting u and v. For this measurement with P=4 parameters, nine measurements are needed at least. For better fitting accuracy, eighteen measurements are used.

Algorithm returns c=0.464 with sensitivity 9.2, d=0.792 with sensitivity 5.1, u=1.105 with sensitivity 1249, v=1.039 with sensitivity 300, a bottom jitter of 6.9.

The ratio between the sensitivities for c,d and u,v are the result of the width of the u and v levels which are 9/4 times larger than the c and d levels.

In another embodiment: the $\Delta T$ after a 3T land and the $\Delta T$ after a 4T land are changed in four steps. The recorded jitters (in %) are in the next table. The values for $\Delta P$:

|  |  | $\Delta T$ after 4T land | | | |
|---|---|---|---|---|---|
| Jitter in % |  | 3T/16 | T/8 | T/16 | 0T |
| $\Delta T$ after 3T land | 3T/16 | 8.37 | 7.40 | 7.17 | 7.84 |
|  | T/8 | 8.64 | 7.29 | 6.61 | 6.94 |
|  | T/16 | 9.80 | 8.28 | 7.48 | 7.37 |
|  | 0T | 11.49 | 10.03 | 9.10 | 8.78 |

The fitted results, together with the measured data:

$\Delta T$ after 3T: Optimum setting 0.126T, sensitivity 8.6

$\Delta T$ after 4T: Optimum setting 0.040T, sensitivity 5.3

With this example, the perfect parabolic nature of the jitter dependency on thermal balancing parameters is confirmed for DVD+R. Therefore, the complete optimization algorithm can be applied for the write once DVD platform.

Figure 3:
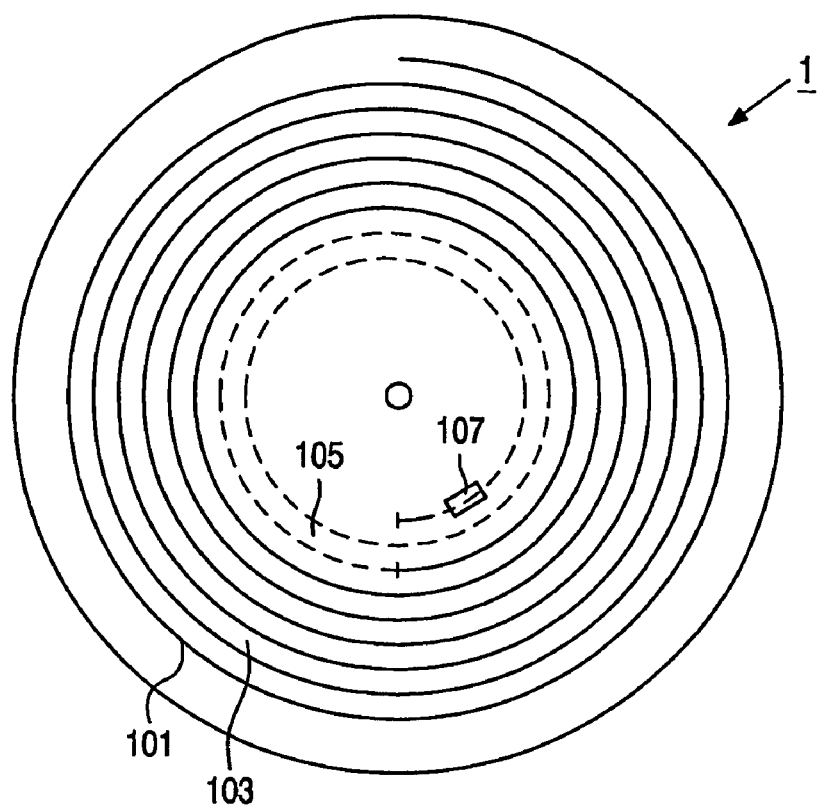
FIG. 3 shows an optical record carrier according to invention.

FIG. 3 shows a disc-shaped optical record carrier 1 according to the invention. Recording layer of the record carrier can be inscribed optically or magneto-optically by a recording device. Information on the record carrier is represented by pattern of marks. Information is recorded in track by a recording process in which each mark is formed by one or more recording pulses of constant or varying recording power levels P. The recording parameters of the recording process, such as the recording power level P, the number of pulses are to be tuned for the record carrier, in particular due to its material properties. An example of an inscribable record carrier is the known CD Write-Once. The record carrier has a continuous track 101 intended for recording. The track 101 may be spiral and in the form of an embossed groove or ridge. The area of the record carrier is divided in an information recording area 103 for recording user information and control area 105 for storing information relevant for recording user information. The control area 105 is marked by a dashed track in the fig. The value of optimum recording power levels $P_{opt}$ for recording the record carrier may be stored as a pattern of control information in the control area 105. When the control area is embossed, the manufacturer of the record carrier 1 must record the value. Alternatively, the value may be recorded by user during, for instance, initialization of the record carrier 1, allowing the recording of a carrier-specific value.

FIG. 4 shown a strongly enlarged portion 107 of the track comprising a pattern of marks 109 in which the control information is encoded.

Although has been explained by an embodiment using the recording power level as recording parameter, it will be clear that other recording parameters (e.g. specific timing of the recording pulse pattern for recording a mark) may be employed in the invention.

It is apparent to those skilled in the art that the invention may be applied to alternative optical recording systems such as e.g. DVD, Blue-Ray, etc.

The invention claimed is:

1. A method of determining values of a set of recording pulse series parameters for optical carrier recording, where the recording pulse series are applied to a recording surface of an optical record carrier for writing a pattern of optically readable marks on the record carrier, a mark being formed by one recording pulse series, said method comprising the steps of:

writing a write test on the optical record carrier, each write test comprising a number N of test patterns, said test patterns having pre-determined values of the set of the recording pulse series parameters, said pre-determined values being different for each test pattern reading the test pattern and forming a read signal; and measuring jitter values of the read signal corresponding to each test pattern, wherein the values of the set of the recording pulse series parameters are optimized using a linear dependence between the values of a set of recording pulse series parameters and relative jitter values, and wherein the minimum number $N_{min}$ of the test patterns is dependent upon a number P of the recording pulse series parameters according to the equation:

$$N_{min}=2*P+1.$$

2. The method as claimed in claim 1, wherein the pattern of optically readable marks corresponds to a run-length limited code sequence.

3. The method as claimed in claim 1, wherein the test patterns comprise a random run-length limited code sequence.

4. The method as claimed in claim 1, wherein the parameter denotes a radiation power of one of the recording pulses of the recording pulse series.

5. The method as claimed in claim 1, wherein the parameter denotes a width of one of the recording pulses of the recording pulse series.

6. The method as claimed in claim 1, wherein the set of the optimized values of the recording pulse series parameters is recorded on the optical record carrier.

7. The method as claimed in claim 4, where the parameters for 3T marks differ from the parameters for longer marks and where T represents the time length of one period of a reference clock in a data signal.

8. A device for determining values of a set of recording pulse series parameters for optical carrier recording, comprising;

recording means for writing a pattern of optically readable marks on a record carrier by irradiating a recording surface of the record carrier with recording pulse series, a mark being formed by one recording pulse series;

a test signal generator for generating a test signal comprising a plurality N of test patterns and supplying the test signal to an input of the recording means;

reading means for reading marks on the record carrier and supplying a read signal;

a jitter detector for measuring jitter values of the read signal corresponding to the plurality N of test patterns and supplying a jitter signal to;

control means coupled to receive the jitter signal for optimizing the values of the set of the recording pulse series parameters and supplying a control signal representing the optimized set of the recording pulse series parameters; and processing means coupled to receive the control signal for converting input information to be recorded into an output signal supplied to the recording means, the output signal corresponding to pulse series of radiation and representing the input information, said processing means generating the output signal in dependence on the set of recording pulse series parameters, wherein optimized values of the set of the recording pulse series parameters are provided by the control signal, wherein the control means derives the optimized values of the set of the recording pulse series parameters using a linear dependence between the values of a set of recording pulse series parameters and relative jitter values, and wherein the minimum number $N_{min}$ of the test patterns is dependent upon a number P of the recording pulse series parameters according to the equation:

$$N_{min}=2*P+1.$$

9. The device as claimed in claim 8, wherein said device further comprises:

storage means for storing coefficients of the linear dependence between the values of a set of recording pulse series parameters and the relative jitter values.

10. The device as claimed in claim 9, wherein said device further comprises:

storage means for storing the set of the optimized values of the set of the recording pulse series parameters.

* * * * *